US006763396B2

(12) United States Patent
Torikai (10) Patent No.: US 6,763,396 B2
(45) Date of Patent: Jul. 13, 2004

(54) NETWORK CONNECTED DEVICE CAPABLE OF INITIATING PERIODIC UPDATE OF OPERATING UTILITIES

(75) Inventor: Kazuya Torikai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/875,741

(22) Filed: Jun. 6, 2001

(65) Prior Publication Data

US 2001/0027469 A1 Oct. 4, 2001

Related U.S. Application Data

(63) Continuation of application No. 09/182,362, filed on Oct. 29, 1998.

(30) Foreign Application Priority Data

Nov. 1, 1997 (JP) .............................................. 9-316086

(51) Int. Cl.[7] .............................. G06F 15/16; G06K 1/00
(52) U.S. Cl. ........................ 709/250; 709/224; 358/1.15
(58) Field of Search ......................... 709/250, 223–224, 709/217, 219, 229, 225; 358/1.14, 1.15

(56) References Cited

U.S. PATENT DOCUMENTS

| 5,131,077 A | | 7/1992 | Indei |
|---|---|---|---|
| 5,533,174 A | * | 7/1996 | Flowers, Jr. et al. ........ 358/1.15 |
| 5,580,177 A | | 12/1996 | Gase et al. |
| 5,586,255 A | * | 12/1996 | Tanaka et al. ............... 709/223 |
| 5,625,757 A | * | 4/1997 | Kageyama et al. ......... 358/1.14 |
| 5,727,135 A | * | 3/1998 | Webb et al. ................. 358/1.14 |
| 5,841,981 A | * | 11/1998 | Kondo ......................... 709/223 |
| 5,935,217 A | * | 8/1999 | Sakai et al. .................. 709/229 |
| 5,935,262 A | * | 8/1999 | Barrett et al. .................. 714/46 |
| 5,982,994 A | * | 11/1999 | Mori et al. ................. 358/1.15 |
| 6,021,429 A | * | 2/2000 | Danknick .................... 709/250 |
| 6,148,346 A | * | 11/2000 | Hanson ....................... 709/321 |
| 6,240,456 B1 | * | 5/2001 | Teng et al. .................. 709/250 |

FOREIGN PATENT DOCUMENTS

| JP | 9-114614 | 5/1997 |
|---|---|---|
| JP | 9-251355 | 9/1997 |

OTHER PUBLICATIONS

Copy of Japanese Office Action dated Feb. 2, 2000 and translation of relevant portion.
Copy of European Office Action dated Nov. 20, 2002.

* cited by examiner

Primary Examiner—Hosain Alam
Assistant Examiner—Philip B. Tran
(74) Attorney, Agent, or Firm—Dickstein, Shapiro, Morin & Oshinsky, LLP.

(57) ABSTRACT

An electronic device connectable to a network comprises the communicators' address table 8 in which communication address information of the network server 17 was entered, the setting memory section 13 memorizing an information verification cycle verifying update circumstances of an information, the network access control section 5 controlling accesses between the network 1 and the relevant electronic device, the updating information control section 11 communicating with the network server 17 which is located in a communication address memorized in the communicators' address table 8 on the basis of an information verification cycle memorized in the setting memory section 13 and verifying and controlling update circumstances of an information, and the means 18 for communicating with the network server 17 in the case where an information updated was verified in the updating information control section 11 and acquiring the information.

22 Claims, 8 Drawing Sheets

FIG. 1

FIG. 2  COMMUNICATORS' ADDRESS TABLE

| NO. | CONTROL OBJECTIVE ITEM | COMMUNICATORS' ADDRESS TABLE | MEMORY FLAG |
|---|---|---|---|
| 1 | Printer Driver | ftp://ftp.printer.driver1.nec.co.jp | 1 |
| 2 | LAN F/W | ftp://ftp.printer.lanfw1.nec.co.jp | 1 |
| 3 | Printer F/W | ftp://ftp.printer.fw1.nec.co.jp | 0 |
| ⋮ | ⋮ | ⋮ | ⋮ |

FIG. 3  ADMINISTRATOR INFORMATION REGISTRATION SECTION/ ACKNOWLEDGING MEANS MEMORY SECTION

NAME OF ADMINISTRATOR ← EXAMPLE:TORIKAI

ADMINISTRATOR'S ACKNOWLEDGMENT ADDRESS ← EXAMPLE:TORIKAI@ABC.DEF.GH.CO.J

ACKNOWLEDGMENT SETTING FLAG ←
- 0x00 : NO ACKNOWLEDGMENT
- 0x01 : ELECTRONIC MAIL ACKNOWLEDGMENT
- 0x02 : PRINTING OUTPUT ACKNOWLEDGMENT
- 0x03 : ELECTRONIC MAIL & PRINTING OUTPUT ACKNOWLEDGMENT

FIG. 4  INFORMATION CONTROL TABLE

| NO. | CONTROL OBJECTIVE ITEM | UPDATE DATE | ACCESS DATE | START ADDRESS | DATA LENGTH |
|---|---|---|---|---|---|
| 1 | Printer Driver | 97/05/10 00:00 | 97/08/01 | 0x0A0000 | 20480 |
| 2 | LAN F/W | 97/01/20 00:00 | 97/08/01 | 0x0B0000 | 512000 |
| 3 | Printer F/W | 97/07/01 00:00 | 97/08/01 | 0x00 | 0 |
| ⋮ | ⋮ | ⋮ | ⋮ | ⋮ | ⋮ |

NETWORK CONNECTED DEVICE CAPABLE OF INITIATING PERIODIC UPDATE OF OPERATING UTILITIES

CROSS REFERENCE TO RELATED APPLICATIONS

The present application is a continuation under 37 C.F.R. §1.53(b) of prior application Ser. No. 09/182,362 filed Oct. 29, 1998, by Kazuya Torikai entitled ELECTRONIC DEVICE CONNECTABLE TO NETWORK AND METHOD OF INFORMATION ACQUISITION OF THE SAME.

BACKGROUND OF THE INVENTION

The present invention relates to an electronic device such as a network connected printer and a method of information acquisition to update information for controlling basic device operation.

In other words, the invention relates to an apparatus and a method by which a network-connected device such as a printer can be operated to initiate downloading and updating of basic control information such as printer drivers, printing font and the like (referred to generally herein as "printer utilities").

Conventionally, network printers provide job processing information such as job ending time and queue time and the like for one who demands a printing operation. There is an example of a conventional network connecting printer device disclosed in Japanese Unexamined Patent Publication No. 7-76155.

Figure 10:
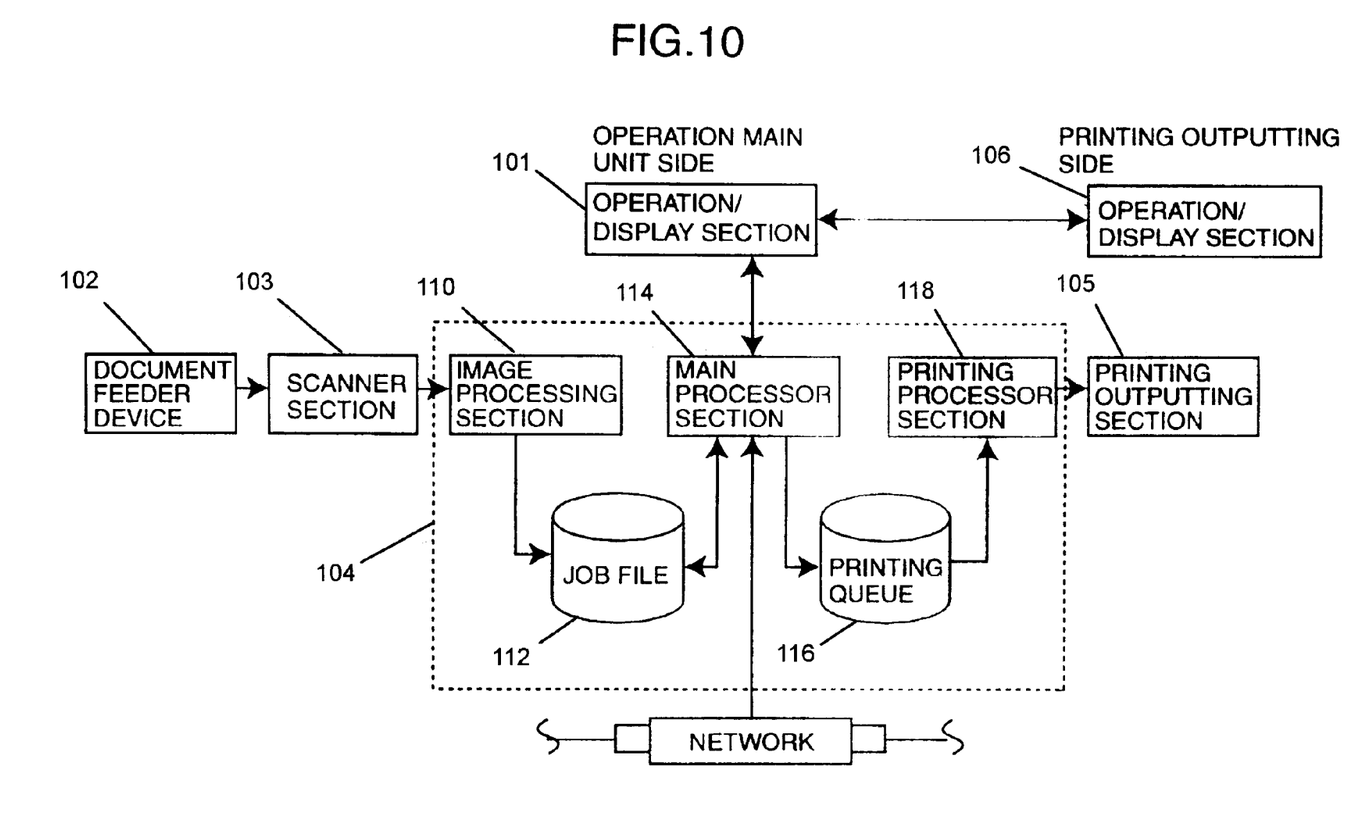
FIG. 10 is a block diagram showing a constitution of an example of the prior art.

A conventional printer device disclosed in this Japanese Unexamined Patent Publication will be described by using FIG. 10. If a job programmed in an operation display section 101 or a job sent from a network client is added to a printing queue 116, a job processing time and a job ending time required for printing is calculated in a main processor section 114 on the basis of a job programming condition, the number of document image pages and data compression rate information of each page. If a job is sent from the printing queue 116 to a printing outputting section 105, a printing processor section 118 updates printing ending time of the job within the printing queue 116. Since a queue time until printing ending of each job resulting from these calculations is displayed on the display section 101, one who demands printing can be advised the time when the job will be completed on the spot or by telephone contact.

Moreover, as other examples of network connecting printer devices, the followings are known.

A printer device connected to a network disclosed in Japanese Unexamined Patent Publication No. 7-121322 is characterized in that it acquires static performance information (e.g.; resolution, sheet size, color available or color not available or the like) indicating attribute information of the printer device and dynamic performance information (e.g.; priming queue job information within queue of the printer device or the like) from a plurality of printer devices on the network and only demand for printing from a user makes the desired printer device automatically chosen by a host computer (workstation) perform a printing.

A printer device connecting to a network disclosed in Japanese unexamined Patent Publication No. 7-334323 is characterized in that a printing server is provided with the means for transmitting various kinds of function setting files to a printer device to change settings.

In Japanese Unexamined Patent Publication No. 8-328781, a workstation on a network controls a printer device connected on the network. Moreover, as control information, there are information indicating printing setting for printing processing, selection items and operation circumstances at present and the like.

A network printer device disclosed in Japanese Unexamined Patent Publication No. 9-6557 is characterized in that it can change from a printer device for outputting to another printer device for outputting through a simple operation on a display of a workstation demanding printing in order to determine a plurality of printer devices for outputting connected on the network. More particularly, it has the means for ascertaining composition of a printer device that a user desires and determining a printer device by acquiring a printing indication setting information from a plurality of printer devices on the network and displaying printing indication operation panel on the display of the workstation. Furthermore, a corresponding printer driver on the side of workstation is selected in accordance with the selected printer device for outputting and printing data is transferred to the printer device.

A network printer device disclosed in Japanese Unexamined Patent Publication No. 9-114615 is characterized in that it has communicating means for verifying functions that a plurality of printer devices connected on the network have. More particularly, printer device internally maintains function information in advance, sends back internally maintained information responding to a demand for an information from a host device. The host device selects a printer device by analyzing received information.

However, all of these conventional network printer devices perform selecting and controlling printing means and printing methods or printer devices for outputting. Conventionally, network printer devices having self-control of printer utilities were not known. In other words, while it was known to make printer utilities available on a network for downloading, network printers have not been able to independently initiate an online search for downloadable information such as updated drivers, printer fonts etc. or other information to support printer operation. Thus, there were problems in conventional network printer devices indicated as follows.

Firstly, a problem is that there is no means for automatically acquiring updated printer utilities. The reason is that it has been necessary for an administrator to consciously make some effort to learn of updated printer utilities.

Secondly, another problem is that printers have only had display sections as a means for reporting to the administrator that printer utilities have been updated. The reason why is that a printer device has no means for transmitting information by itself to the administrator.

SUMMARY OF THE INVENTION

An objective of the present invention is to solve these problems before mentioned.

It is a further objective of the present invention to provide for automatic acquisition by a printer of updated printer utilities and reporting of the update to the administrator. Another objective of the present invention is to automatically acquire updated printer utilities by a printer itself.

The present invention is an electronic device such as a network printer which is capable of independently connecting to a network to access a network server and to search for and download updated printer utilities from the server.

Moreover, the objective above described is achieved by providing a communicators' address table into which communication address information (i.e., addresses of network servers from which updated printer utilities can be downloaded), is entered, a setting memory section in which update verification cycle information (which specifies how frequently the system checks the network servers to determine if updated utilities are available) is entered, a network access control section controlling accesses between the network and the present invention, an updating information control section that communicates with the network servers and checks for and downloads updated utilities, if available, on the basis of the verification cycle information stored in the setting memory section.

Moreover, the present invention is an electronic device such as a network printer capable of connecting to a remote network server, and the present invention is applied to a method of information acquisition by the printer of utilities which are maintained in the server for downloading.

Furthermore, the objective above described is achieved by downloading printer utility updates whenever it is determined that updates are available, as well as through communication with the network servers on the basis of verification cycle information.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, the embodiment of the present invention will be described in detail with reference to the drawings.

Figure 1:
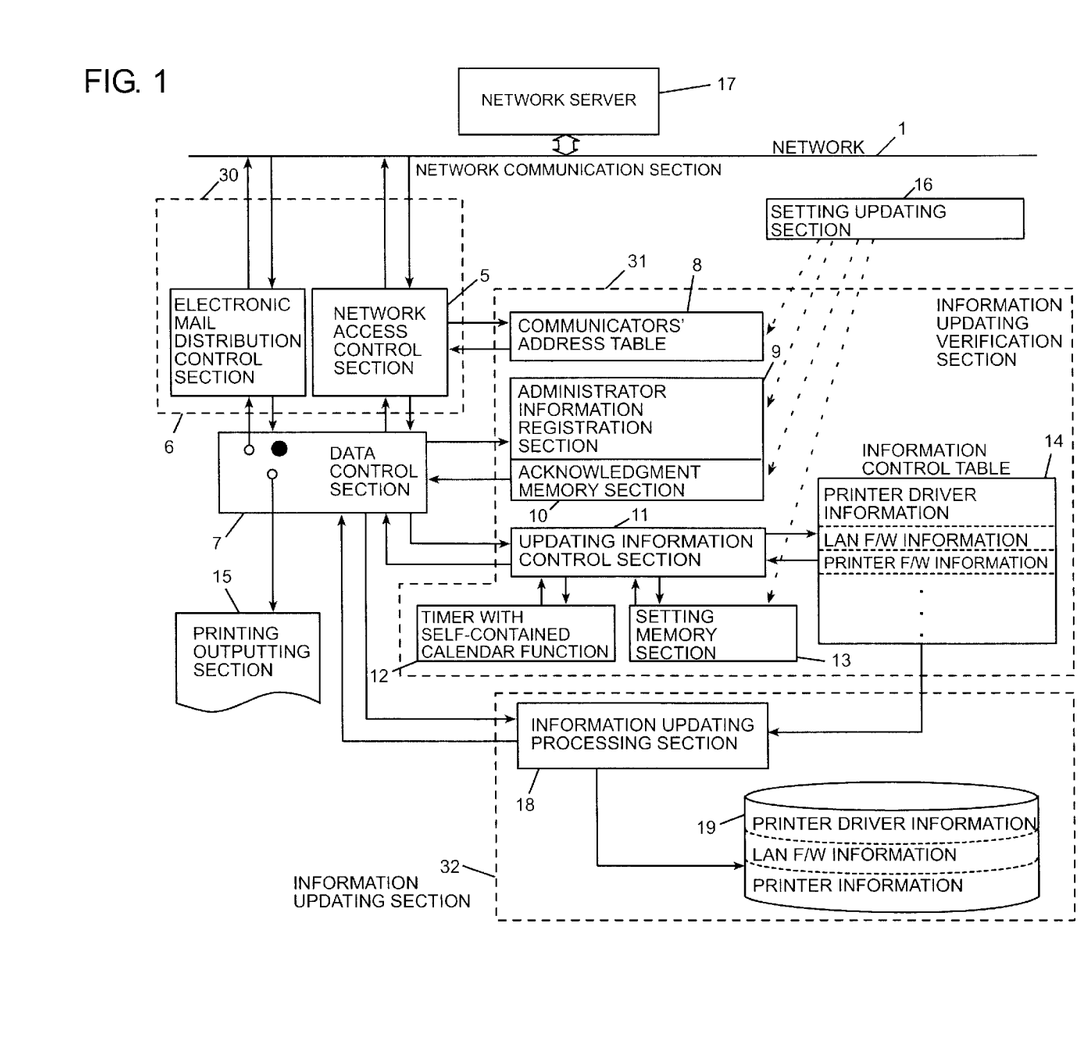
FIG. 1 is a block diagram showing a constitution of an embodiment of the present invention.

FIG. 1 is a block diagram showing an embodiment of a network printer device to which the present invention is applied. In FIG. 1, an embodiment of the present invention includes a network communication section 30 comprised of a network access control section 5 for connecting with a network 1, which may be a communication channel or device of any suitable type, information update verification section 31 for pre-setting update verification control information in an information control table 14 and periodically verifying whether or not updated printer utilities are available, and an information updating section 32 for updating printer utilities on the basis of update information maintained in an update information memory section 19. The current printer utilities are maintained by an administrator for a network or the original developer of the printer device on a network server 17. The information may be maintained, for example, on an FTP site, a web site or the like for downloading to a printer device over network 1.

The network communication section 30 includes the network access control section 5 for receiving information from the network server 17 using a suitable network communication protocol which controls communication with the network server 17 via the network 1, a network server access protocol which controls receiving information from the network server 17 and interpreting the received information, and a mail distribution control section 6 for distributing information by using a mail communication protocol for distributing information by electronic mail to the administrator for printer devices. Among the available network communication protocols, there are, for example, TCP/IP (Transmission Control Protocol/Internet Protocol) protocol and the like. Moreover, among the available network server access protocols, are for example, HTTP (Hyper Text Transfer Protocol) protocol or FTP (File Transfer Protocol) protocol and the like.

The information updating verification section 31 includes a communicators' address table 8 for maintaining communication address information of a plurality of the network servers 17, an information control table 14 where control printer utilities are controlled and stored, an updating information control section 11 for updating and controlling control information within the information control table 14 on the basis of information received from the network access control section 5, an administrator information registration section 9 for maintaining information of the administrator for printer devices, and acknowledgment memory section 10 for storing a reporting routine and for reporting to the administrator when a utility has been updated.

Figure 2:
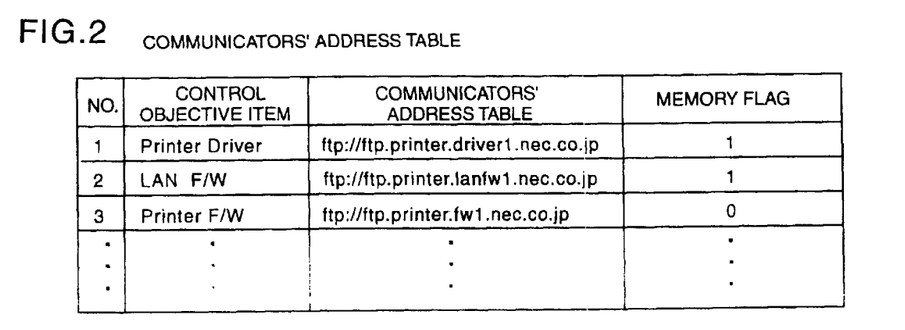
FIG. 2 is a detail block diagram of the communicators' address table of FIG. 1.

Communicators' address table 8 shown in FIG. 2 contains data for each updatable printer utility. The data includes Control Objective Item information, i.e., identification of the utility, the communicator's addresses, e.g., the URLs of network servers 17 from which the utilities are available, and a memory flag indicating if an a new utility has been downloaded and stored in memory section 19. In the illustrated example, data concerning three utilities are recorded: a printer driver (item 1), firmware (F/W) for connecting the printer device to network 1 (item 2), and printing plotting control firmware (item 3).

Figure 3:
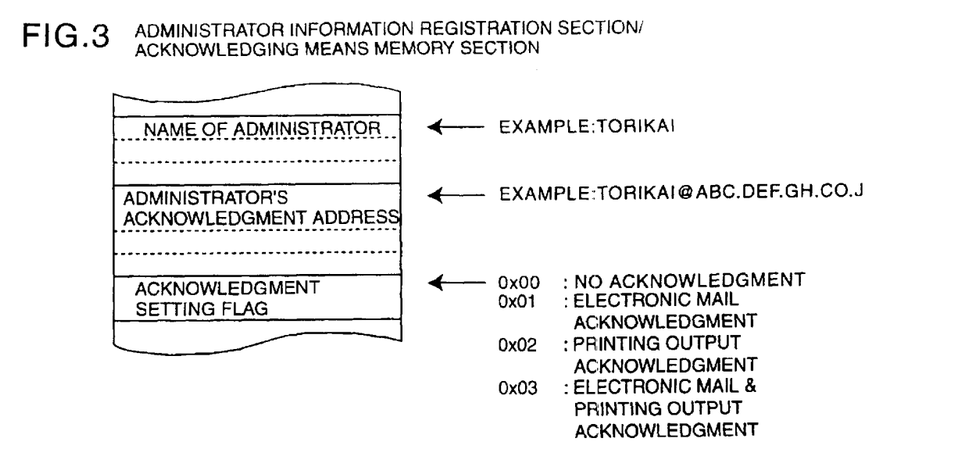
FIG. 3 is a detail block diagram of the administrator information registration section and the acknowledging means memory section of FIG. 1.

The administrator information registration section 9, as shown in FIG. 3, is comprised of the name of the administrator and the administrator's acknowledgment address. Moreover, the acknowledgment memory section 10, as shown in FIG. 3, stores an acknowledgment setting flag to indicate how acknowledgment is to be sent to the administrator for printer devices when a printer utility has been updated. In the illustrated example, four flag states (0x00, 0x01, 0x02, and 0x03) are provided for. These respectively indicate "do not acknowledge", "electronic mail acknowledgment", "printing output acknowledgment" and "electronic mail and printing output acknowledgment").

Figure 4:
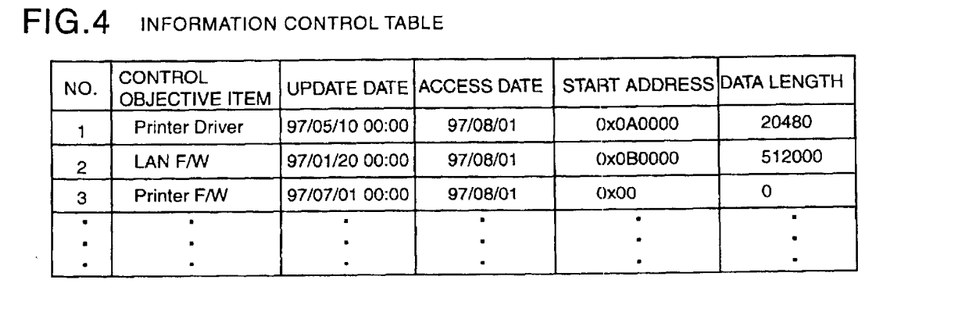
FIG. 4 is a detail block diagram of the information control table of FIG. 1.

The information control table 14 is, as shown in FIG. 4, comprised of utility identification data, update dates of information on the network server 17, access dates when a printer device of the present invention last accessed the network server, a start address within the update information memory section 19 in the case where control information is memorized in the update information memory section 19 described later and a data length indicating an information amount of an information.

The update information control section 11 periodically polls the network servers 17 according to information maintained in the information control table 14 to determine if updated utilities are available. The polling frequency is determined from verification cycle information stored in setting memory section 13. If updates are available, information control table 14 is updated accordingly.

Figure 5:
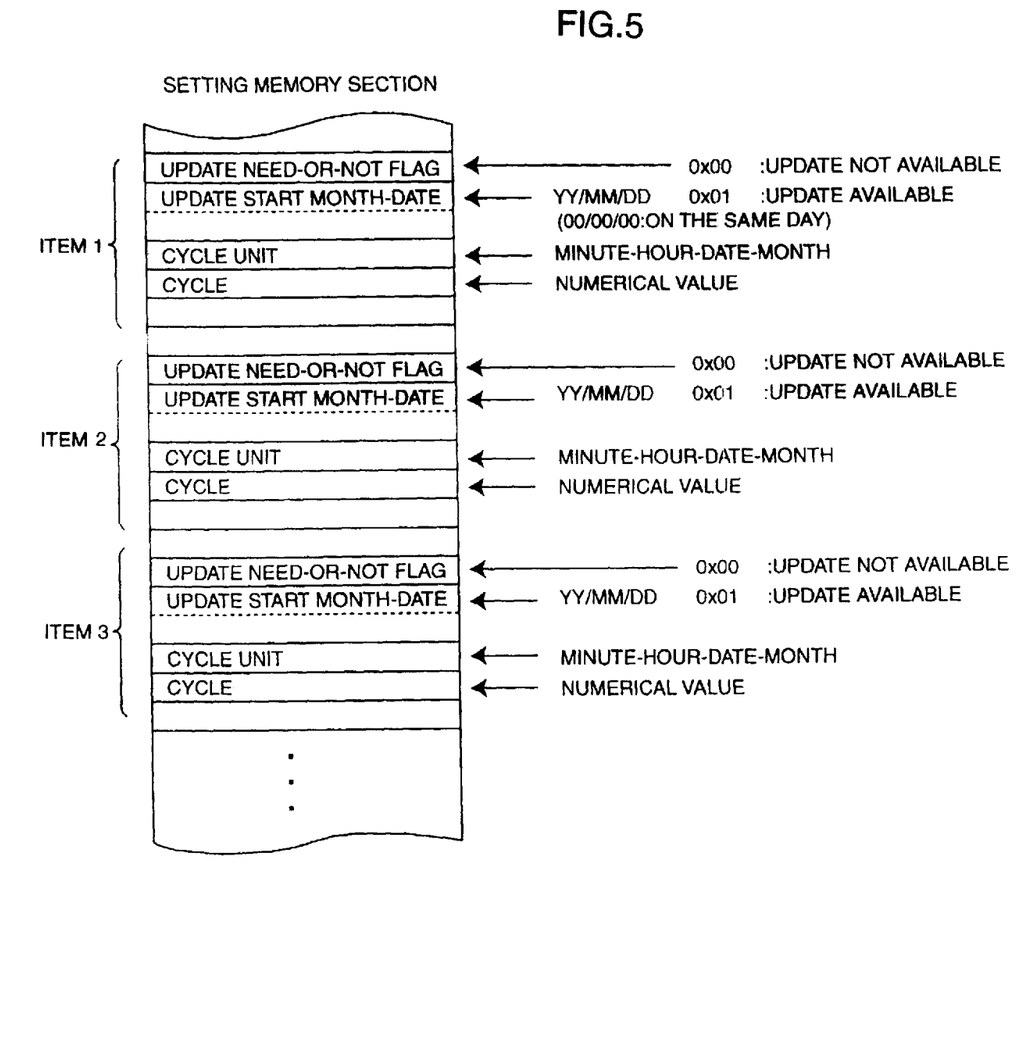
FIG. 5 is a detail block diagram of the setting memory section of FIG. 1.

The setting memory section 13 is, as shown in FIG. 5, comprised of an update need-or-not flag indicating if a utility update is needed or not, update start month-year information indicating a month and year for a first update verification, a numeric value of an update verification cycle and information indicating the update verification cycle unit. By way of example, if the numeric value is 2 and the cycle is "hour", the corresponding network server 17 is polled every 2 hours. Moreover, the setting memory section 13 has also a timer 12 having a built-in calendar function for controlling operation of the update information control section 11.

The information updating section 32 has an information updating processing section 18 for updating a printer utility in response to a request from the system administrator to update one or more printer devices or a request from update information memory section 19 for maintaining update information.

In addition, the illustrated embodiment has the communicators' address table 8, the administrator information registration section 9, the acknowledgment memory section 10 and a setting updating section 16 for changing a setting of the setting memory section 13. The setting updating section 16 provides, for example, inputting means such as operator's panel having input keys incorporated in the printer device or a separate input device to change a setting by a software setting command or the like. Moreover, as a means for acknowledging to the administrator by printing output, a printing outputting section 15 may be employed.

Next, referring to block diagrams from FIG. 1 to FIG. 5 and flowcharts from FIG. 6 to FIG. 9, operations of the network printer device of the invention will be described in detail below.

Firstly, referring to the flowchart of FIG. 6, the initial procedures involved in updating of printer utilities will be described in detail below.

Figure 6:
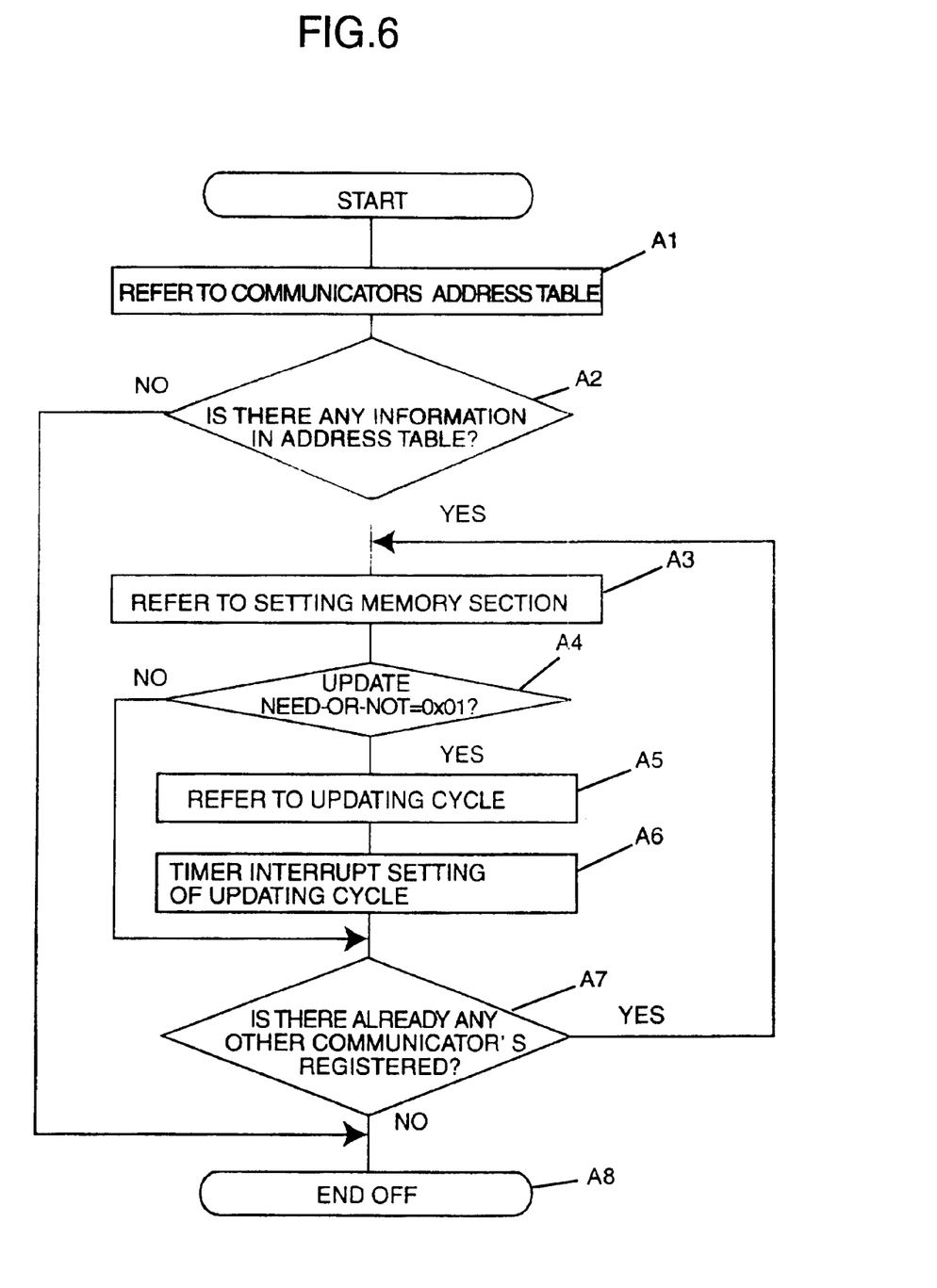
FIG. 6 is a flowchart showing a process of a preprocess performing updating work.

The flowchart of FIG. 6 is executed after power-up of the primer device or after a hard reset without power-up. First, the setting updating section 16 determines whether printer utility update information stored in the communicators' address table 8. If not, the process terminates (step A8).

In the example of the communicators' address table 8 of FIG. 2, three (3) items are stored. Information of printer driver ("Printer Driver") to be incorporated in a client computer at the time of printing is memorized in the item 1, information of a firmware program ("LAN F/W") of the network communication control section including the network communication section 30 which is necessary at the time of network connection of the printer device is memorized in the item 2, and information of a firmware program ("Printer F/W") of the printing plotting control section including the printing outputting section 15 is memorized in the item 3, respectively.

After verifying that at least one item is stored in address table 8, the setting memory section 13 in which an updating cycle of its information is stored is referred to (Step A3). In the setting memory section 13, as shown in FIG. 5, an update need-or-not flag, an update verification start month-date and a cycle information are stored for each utility having a corresponding item stored in address table 8. At Step A4, the update need-or-not flag is examined. If the flag is 0x01, this indicates that updating the corresponding utility is expected. If the flag is 0x01, this indicates that updating is not needed. In that case, utility update verification processing is not executed, and the process shifts to Step A7 described below.

In the case where an update need-or-not flag is 0x01, subsequently, an update start month-date and an updating cycle for a utility are referred to (Step A5). The update start month-date information indicates an initial month-date-year for checking for an updated utility. In the case of executing en updating verification on the same-day, as shown in the item 1 of FIG. 5, the month-date-year value is set as a 00/00/00. The verification cycle is specified in units of minute, hour, date and month.

On the basis of an update start month-date and a cycle information, the updating information control section 11 performs a setting of a timer interrupt of an updating cycle by utilizing a self-contained timer with calendar function (Step A6). By setting this timer interrupt, an interrupt request which promotes update verification of an information of control objective is generated at the time when it is set in an updating cycle. Since a timer interrupt setting in an updating cycle is performed to all of the control information memorized in the communicators address table 8, it is repeated until a setting for all of the utilities information is completed (Step A7). The process then terminates (Step A8).

Figure 7:
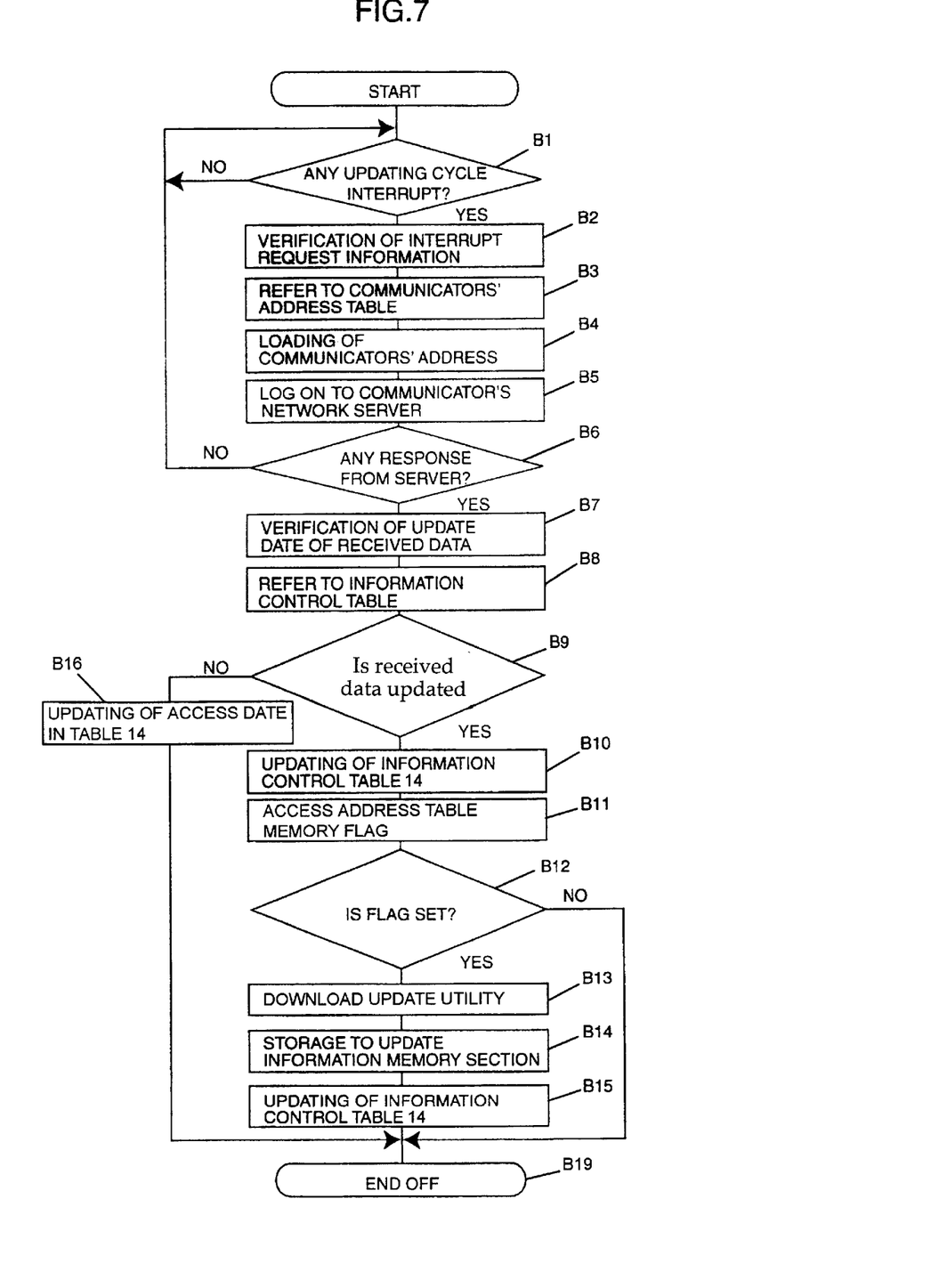
FIG. 7 is a flowchart showing a process of updating verification processing of information.

Next, referring to the flowchart of FIG. 7, the process of performing updating control information will be described in detail below.

By setting a timer interrupt in an updating cycle executed at Step A6 of FIG. 6, whether or not an interrupt request is generated at the time when an updating verification cycle is set in is determined (Step B1). When an interrupt is detected, the source of the interrupt, i.e., the particular utility items stored in address table 8 and setting memory section 13, is verified (Step B2).

Next, address table 8 is accessed, and the address of the network server 17 associated with the interrupt request is loaded (Steps B3 and B4). For example, if an interrupt request related to item 1 (Printer Driver) was generated, in Step B4, the network server address for item 1, i.e., ftp://ftp.printer.driver1.nec.co.jp is loaded (see FIG. 2).

Subsequently, network access control section 5 is executed to log on to the network server 17 for item 1 (Step B5). Specifically, network access control section 30 verifies updated control information and accesses the network server 17 via the network 1 using the network server access protocol and network communication protocol and the address of the item 1 network server 17 acquired in Step B4.

Whether or nota response is sent back from the network server 17 in response to an update verification request of a communicator's address "ftp://ftp.printer.driver1.nec.co.jp". to the network server of in FIG. 2 is determined at Step B6. If a response is received from the network server 17 for item 1, the network access control section 5 transfers the received information to the updating information control section 11. The updating information control section 11 refers to the received data and verifies the revision date of the utility, i.e., the Printer Driver maintained in the network server 17 at Step B7 (Step B9).

If the two dates are the same, there is no new or revised version of the printer driver available. In that case, the last access date for the item (1) network server is updated in information control table 14 (Step B16), but the last revision date stored in information control table 14 is not updated. If the revision date for the utility available on network server 17 is later than the last revision date stored in information control table 14, this indicates that a new or updated printer driver is available. In that case, both the last revision date and the last access date stored in information control table 14 are updated (Step B10).

Next, the process and the procedure for determining whether or not to save an updated utility downloaded from network server 17 in the update information memory section 19 will be described. First, a memory flag for item 1 in address table 8 (See FIG. 2) is accessed (Step B11).

In the case where a memory flag is set, that is to say, the flag is "1", an updated utility is downloaded from the network server 17 and stored in the update information memory section 19. If the memory flag is not set, that is to say, the flag is 0, only the existence of an update is verified but the utility stored on the server is not downloaded (Step B12).

In an example of a Printer Driver information of the item 1 of address table 8 in FIG. 2, the memory flag value is "1". Thus, the network access control section 5 makes a request that the updated driver be downloaded. The procedure is the same as for verifying an update circumstances of the item 1 to the network server 17 as described in connection with step B5 above.

On the basis of the request, an updated Printer Driver is downloaded from the network server 17 at Step B13. The received data is stored to the update information memory section 19 by the information updating processing section 18 for subsequent local use (Step B14). Then, the stored data is sent from the information updating processing section 18 to the updating information control section 11. The information sent from the information processing section 18 to the updating information control section 11 is a start address of the data stored in the update information memory section 19 and a data length indicating the size of a data. In order to store these information, as shown in FIG. 4, the updating information control section 11 stores a start address information and a data length in the information control table 14 (Step B15).

Figure 8:
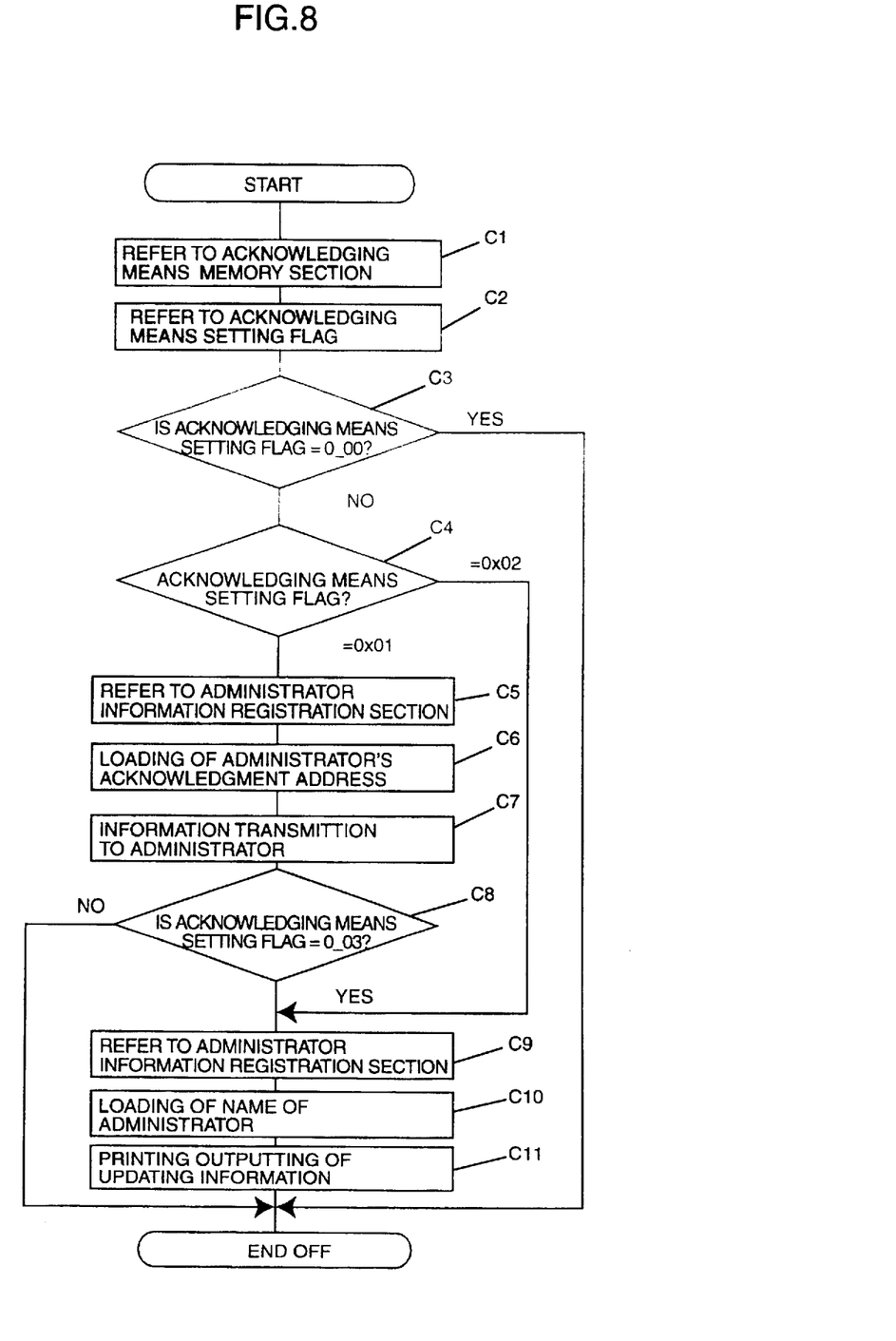
FIG. 8 is a flowchart showing a process of result acknowledging process to the administrator.

Next, referring to the flowchart of FIG. 8, in the case where a printer utility was updated, the process by which this is acknowledged to the administrator for printer devices will be described in detail below.

First, an acknowledgment setting flag of the acknowledgment memory section 10 shown in FIG. 3 is verified (Step C1 and Step C2). In an example of FIG. 3, a setting value is defined with one byte information. In the case where a value of an acknowledgment setting flag is 0x00, it is defined that update circumstances of control information is not to be acknowledged to the administrator for printer devices. Thus, whether the value of the acknowledgment setting flag is 0x00 or not is determined (Step C3).

If the acknowledgment setting flag is not 0x00, in an example of FIG. 3, if a value is 0x01, it is defined that "acknowledgment of circumstances by electronic mail" to the administrator for printer devices is performed, if a value is 0x02, it is defined that "acknowledgment of circumstances by printing output" to the administrator for printer devices is performed, and if a value is 0x03, it is defined that "concurrent use of acknowledgment of circumstances by electronic mail and acknowledgment of circumstances by printing output" to the administrator for printer devices is performed, respectively.

In the case where a setting value of an acknowledgment setting flag is 0x01, the administrator's acknowledgment address of the administrator information registration section 9 shown in FIG. 3 is referred to (Step C4 and Step C5). Here, an electronic mail address of the administrator for printer devices is stored. Thus, the data control section 7 sets inside information output switch over in an electronic mail distribution, the administrator's acknowledgment address information of the administrator information registration section 9 is transferred to the electronic mail distribution control section 6 (Step C6). The electronic mail distribution control section 6 acknowledges that the utility was updated to the administrator for primer devices using mail distribution protocol and network communication protocol via the network 1 on the basis of the received administrator's acknowledgment address information by electronic mail (Step C7).

In the case where a setting value of an acknowledgment setting flag is 0x02, the name of the administrator of the administrator information registration section 9 shown in FIG. 3 is referred to (Step C4 and Step C9). Here, identification information such as the name of the administrator for printer devices and the like is stored so that a distribution address of printing output materials can be identified with "acknowledgment of circumstances by printing output". Thus, a data control section 7 sets an inside information output switch over in printing output. Moreover, to print out the administrator identification information of printing devices registered in the name of the administrator of the administrator information registration section 9 is indicated, and that control information was updated is sent as data to the printing outputting section 15 and acknowledged by printing output (Step C10 and Step C11).

In the case where a setting value of an acknowledgment setting flag is 0x03, an acknowledgment of circumstances from Step C9 and Step C11 by printing output in addition to an acknowledgment of circumstances from Step C5 to Step C7 by electronic mail is carried out (Step C8).

Figure 9:
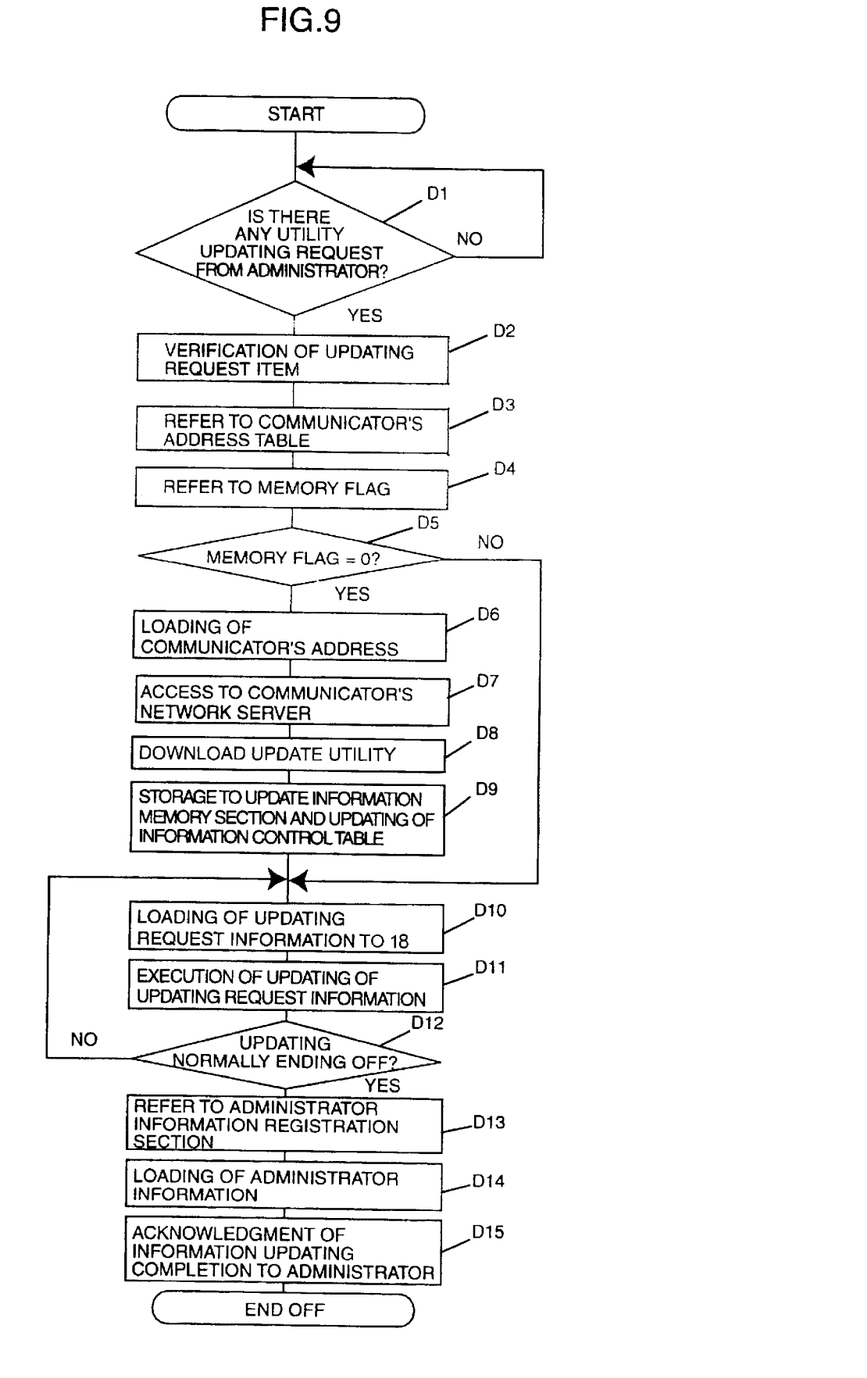
FIG. 9 is a flowchart showing a process of a request process of data updating.

Next, referring to the flowchart of FIG. 9, the process in the case where a utility update is initiated by the administrator for printer devices on the basis of a utility update will be described in detail below.

Whether or not an information updating request from the administrator for printer devices was received is verified at Step D1. An information request from the administrator is directed through the medium of the network communication section 30 via the network 1. At Step D2, the particular printer utility for which the data updating request has been directed is determined by the network access control section 5.

Next, to determine whether data requested for updating is already stored in the update information memory section or not, the network access control section 5 refers to a memory flag of the address table 8 shown in FIG. 2 (Step D2 and Step D3). In the case where a memory flag is "1", an update for the utility in question is already stored in the update information memory section 19 in the process from Step B12 to Step B14 of the flowchart of FIG. 7 is shown. Moreover, in the case where a memory flag is "0", since an available utility update has not been downloaded from the network server 17, first of all, it is necessary to download the requested utility update from the network server 17 (Steps D6 through D8).

Hereinafter, referring to a case of the item 3 (Printer F/W) within the communicators' address table 8 of FIG. 2, an explanation will be described. As referring to a memory flag of the communicators' address table 8, a memory flag for the item 3 is "0". Thus, since data required for updating is not stored in the update information memory section 19, it must be downloaded from the network server 17. First, referring to a communicator's address of the communicators' address table 8 shown in FIG. 2, an address information is acquired (Step D6). The procedure of data acquisition and storage to the update information memory section is the same as the procedure from Step B13 to Step B15 of the flowchart of FIG. 7. In this example, there is a difference in that the network server 17 to access is a server including an information of the item 3 (Printer F/W) (Step D8 and Step D9).

Updating a particular printer utility begins in a state where data requested for updating is stored in the update information memory section 19. The information updating processing section 18 receives an address and a data length stored in the update information memory section 19, which points to data stored in information control table 14 in FIG. 4 (Step D10).

Based on this information, the updating process is executed (Step D11). For example, in the case where an updating request for the item 2 (LAN F/W) of the communicators' address table 8 in FIG. 2 was received from the administrator, an updating of a firmware program of the network communication control section which is necessary at the time of connecting printer devices including the network communication section 30 to the network is carried out. Moreover, in the case where an updating request to the item 3 (Printer F/W) was received from the administrator, an updating of a firmware program of the printing plotting control section including the printing outputting section 15 is carried out. The execution of the updating may be done in any conventional fashion. In this embodiment of the present invention, the procedure of updating data is not claimed per se.

Whether an updating of data requested was normally and completely executed or not is verified, and in the case where the updating was not completed, an updating processing is executed again by returning to Step D10 (Step D12). When the updating of data requested is normally completed, a completion acknowledgment is sent to the administrator for printer devices who requested the updating. A completion acknowledgment to the administrator depends upon a setting value of an acknowledgment setting flag of the acknowledging means setting memory section 10 shown in FIG. 3. The procedure of acknowledgment is the same as the procedure described in the flowchart of FIG. 8 (from Step D13 to Step D15).

Thus, according to this embodiment of the present invention, the following effects can be obtained.

The first effect which can be obtained according to the present invention is that updated printer utilities can be automatically and periodically downloaded without action by the administrator. The reason is that this embodiment of the present invention comprises an address table for memorizing information of the network server maintained a plurality of optional data and the updating information control section for periodically verifying information.

The second effect which can be obtained according to this embodiment of the present invention is not only that update printer utilities can be downloaded, but also that acknowledgment can be provided to the administrator for printer devices in the sole case where the information was updated. As information providing means, it enables to send an electronic mail or to print output in printer devices. The reason why is that it comprises the information control table and enables to compare a revision date of a received information with an update date controlled within a control table end verify them. Moreover, as acknowledging means, by having the electronic mail distribution control section, it enables to not only acknowledge to the administrator by printing output, but also acknowledge to the administrator by electronic mail.

The third effect which can be obtained according to the present invention is taht updates for printer utilities can also be obtained according to an instruction from the administrator. The reason is that it has the information updating processing section and the update information memory section for maintaining necessary data for updating data such as programs and the like within printer devices.

Furthermore, it should be noted that as for an electronic device connectable to the network of the present invention, its details are not limited by an embodiment of the present invention described above, various alternations of them are possible. As an example, the communicators' address table 8 is used for storing information related to printer utilities, but the information stored is not necessarily so limited. For example, in the case where the network server 17 of fixed address maintaining a certain data exists, a communicator's address of this network server 17 can be also stored in the communicators' address table S. As an example of FIG. 2, although the item 1 printer Driver. is an information involving with printer devices, since it is not applicable to data such as firmware programs of printer devices and the like, the present invention is adapted to a use for verifying update circumstances and receiving data of "Printer Driver". A data verified updating of information and received from the network server 17 also can be similarly maintained in the update information memory section 19.

The "Printer Driver" stored in the update information memory section 19 is not internal to the printer device, a data receiving request for the data is honored by the way of the network 1 from the computer of the administrator upon request. Also in this case, the information updating processing section 18 is able to perform distribution of data stored in the network access control section 5 and in the update information memory section 19 by the way of a network communication protocol 2.

Furthermore, while the above described embodiment is described as applied to printer devices, the invention is not limited to this application. Other electronic devices such as facsimile devices and the like which are connectable to a network may also be employed.

As described above in detail, according to the present invention, it enables to acquire information involving with an electronic device such as a printer device and the like by itself and acknowledge update circumstances to the administrator. Moreover, it can acquire information involving with electronic devices and update data within the electronic devices.

The entire disclosure of Japanese Patent Application No. 9-316086 filed on Nov. 1, 1997 including specification, claims, drawing and summary are incorporated herein by reference.

What is claimed is:

1. An electronic device connectable to a network, the network providing access to at least one network server that stores a downloadable update of an operating utility for the electronic device; the electronic device comprising:

an address table that stores access address information for the network server;

a setting memory section that stores utility update verification cycle information representing a frequency at which the network server is to be accessed to determine the existence of an updated utility;

a network access control section that controls access between the network and the electronic device;

an updating information control section that cooperates with the network access control section to communicate with the network server at the address stored in the address table at the frequency indicated by the update verification cycle information; and a communication device that cooperates with the network access control section to access the network server at the address stored in the address table and to download an updated utility for the electronic device when available.

2. An electronic device as claimed in claim 1, further including a first information control table that stores a date on which the network server was last accessed to check for availability of an updated utility, and a date on which an updated utility was most recently downloaded from the network server.

3. An electronic device as claimed in claim 2, wherein the utility updates downloadable from the network server include printer drivers and firmware for use by printer devices.

4. An electronic device as claimed in claim 1, further including:

an update information memory section that stores an updated utility downloaded from the network server; and a second information control table that stores memory addresses and data sizes of downloaded utility updates stored in the update information memory section.

5. An electronic device as claimed in claim 1, further comprising:

an administrator information registration section that stores identification information and an electronic mail address of an administrator for the electronic device;

an electronic mail distribution section that cooperates with the administrator information registration section to distribute utility update status information to an electronic mail address of an administrator; and a printing output device that cooperates with the administrator information registration section to print utility update status information and identification information of an administrator, and wherein update status acknowledgment mode information set by the electronic mail distribution section and the printing outputting section is stored in the administrator information registration section;

the electronic device further including a control section that operates at least one of the electronic mail distribution section and the printing output device to generate an update status acknowledgment based on the update status acknowledgment mode information stored in the administrator information registration section.

6. An electronic device as claimed in claim 5, further including an information updating processing section responsive to an instruction from the administrator to initiate updating of a utility using information stored in the update information memory section.

7. An electronic device as claimed in claim 1, wherein the electronic device is a printer.

8. An electronic device connectable to a network, the network providing access to at least one network server that stores a downloadable update of an operating utility for the electronic device; the electronic device comprising:

an address table that stores access address information for the network server;

a setting memory section that stores utility update verification cycle information representing a frequency at which the network server is to be accessed to determine the existence of an updated utility;

a network access control section that controls access between the network and the electronic device;

an updating information control section that cooperates with the network access control section to communicate with the network server at the address stored in the address table at the frequency indicated by the update verification cycle information;

a communication device that cooperates with the network access control section to access the network server at the address stored in the address table and to download an updated utility for the electronic device when available;

an update information memory section that stores an updated utility downloaded from the network server; and a second information control table that stores memory addresses and data sizes of downloaded utility updates stored in the update information memory section.

9. An electronic device as claimed in claim 8, wherein the electronic device is a printer.

10. An electronic device as claimed in claim 9, wherein the utility updates downloadable from the network server include printer drivers and firmware for use by printer devices.

11. An electronic device connectable to a network, the network providing access to at least one network server that stores a downloadable update of an operating utility for the electronic device; the electronic device comprising:

an address table that stores access address information for the network server;

a setting memory section that stores utility update verification cycle information representing a frequency at which the network server is to be accessed to determine the existence of an updated utility;

a network access control section that controls access between the network and the electronic device;

an updating information control section that cooperates with the network access control section to communicate with the network server at the address stored in the address table at the frequency indicated by the update verification cycle information;

a communication device that cooperates with the network access control section to access the network server at the address stored in the address table and to download an updated utility for the electronic device when available;

an administrator information registration section that stores identification information and an electronic mail address of an administrator for the electronic device;

an electronic mail distribution section that cooperates with the administrator information registration section to distribute utility update status information to an electronic mail address of an administrator; and a printing output device that cooperates with the administrator information registration section to print utility update status information and identification information of an administrator, and wherein update status acknowledgment mode information set by the electronic mail distribution section and the printing outputting section is stored in the administrator information registration section;

the electronic device further including a control section that operates at least one of the electronic mail distribution section and the printing output device to generate an update status acknowledgment based on the update status acknowledgment mode information stored in the administrator information registration section.

12. An electronic device as claimed in claim 11, wherein the electronic device is a printer.

13. An electronic device as claimed in claim 12, wherein the utility updates downloadable from the network server include printer drivers and firmware for use by printer devices.

14. An electronic device connectable to a network, the network providing access to at least one network server that stores a downloadable update of an operating utility for the electronic device; the electronic device comprising:

an address table that stores access address information for the network server;

a setting memory section that stores utility update verification cycle information representing a frequency at which the network server is to be accessed to determine the existence of an updated utility;

a network access control section that controls access between the network and the electronic device;

an updating information control section that cooperates with the network access control section to communicate with the network server at the address stored in the address table at the frequency indicated by the update verification cycle information;

a communication device that cooperates with the network access control section to access the network server at the address stored in the address table and to download an updated utility for the electronic device when available;

an update information memory section that stores an updated utility downloaded from the network server; and an information updating processing section responsive to an instruction from the administrator to initiate updating of a utility using information stored in the update information memory section.

15. An electronic device as claimed in claim 14, wherein the electronic device is a printer.

16. An electronic device as claimed in claim 15, wherein the utility updates downloadable from the network server include printer drivers and firmware for use by printer devices.

17. An electronic device connectable to a network, the network providing access to at least one network server that stores a downloadable update of an operating utility for the electronic device; the electronic device comprising:

an address table that stores access address information for the network server;

a setting memory section that stores utility update verification cycle information representing a frequency at which the network server is to be accessed to determine the existence of an updated utility;

a network access control section that controls access between the network and the electronic device;

a first information control table that stores a date on which the network server was last accessed to check for availability of an updated utility, and a date on which an updated utility was most recently downloaded from the network server;

an updating information control section that cooperates with the network access control section to communicate with the network server at the address stored in the address table at the frequency indicated by the update verification cycle information;

a communication device that cooperates with the network access control section to access the network server at the address stored in the address table and to download an updated utility for the electronic device when available;

an update information memory section that stores an updated utility downloaded from the network server;

a second information control table that stores memory addresses and data sizes of downloaded utility updates stored in the update information memory section;

an administrator information registration section that stores identification information and an electronic mail address of an administrator for the electronic device;

an electronic mail distribution section that cooperates with the administrator information registration section to distribute utility update status information to an electronic mail address of an administrator; and a printing output device that cooperates with the administrator information registration section to print utility update status information and identification information of an administrator, and wherein update status acknowledgment mode information set by the electronic mail distribution section and the printing outputting section is stored in the administrator information registration section;

the electronic device further including a control section that operates at least one of the electronic mail distribution section and the printing output device to generate an update status acknowledgment based on the update status acknowledgment mode information stored in the administrator information registration section.

18. An electronic device as claimed in claim 17, wherein the electronic device is a printer.

19. An electronic device as claimed in claim 18, wherein the utility updates downloadable from the network server include printer drivers and firmware for use by printer devices.

20. A method of acquiring updated operating utilities by an electronic device from a network server over a network to which the network server is connected, the method comprising steps of:

storing a downloadable update of an operating utility for the electronic device on a network server;

storing utility update verification cycle information representing a frequency at which the network server is to be accessed to determine the existence of an updated utility;

storing information concerning update verification activity;

accessing the network server at the frequency indicated by the update verification cycle information, and in accordance with the stored update verification activity information to determine availability of an updated utility; and downloading an updated utility from the accessed network server when an updated utility is determined to be available.

21. A method of information acquisition as claimed in claim 20, wherein in a step of storing information concerning update verification activity comprises:

storing information as to a date on which the network server was most recently accessed to determine the availability of an updated utility; and storing information as to a date on which an updated utility was downloaded from the network server.

22. A method of information acquisition as claimed in claim 20, the method further comprising the steps of:

storing identification information and an electronic mail address of an administrator for the electronic device;

distributing update status information for utilities downloaded from the network server to a stored electronic mail address of an administrator; and printing update status information for utilities downloaded from the network server together with stored identification information of the administrator.

* * * * *